United States Patent [19]
Soper et al.

[11] 3,849,110
[45] Nov. 19, 1974

[54] HERBICIDAL METHOD EMPLOYING ARYL-SULFONYLUREAS OR SALTS THEREOF

[75] Inventors: Quentin F. Soper; Granville B. Kline, both of Indianapolis, Ind.

[73] Assignee: Eli Lilly and Company, Indianapolis, Ind.

[22] Filed: Jan. 7, 1963

[21] Appl. No.: 249,581

[52] U.S. Cl............................ 71/103, 71/88, 71/90, 71/94
[51] Int. Cl............................................. A01n 9/14
[58] Field of Search...................... 71/2.3, 2.6, 103; 167/30 B

[56] References Cited
UNITED STATES PATENTS

| | | | |
|---|---|---|---|
| 2,385,571 | 9/1945 | Haack | 260/397.7 |
| 2,411,661 | 11/1946 | Martin et al. | 260/397.7 |
| 3,039,863 | 6/1962 | Faucher et al. | 167/30 |

FOREIGN PATENTS OR APPLICATIONS

| | | | |
|---|---|---|---|
| 410,046 | 2/1925 | Germany | 71/2.6 |
| 445,504 | 6/1927 | Germany | 71/2.6 |

*Primary Examiner*—James O. Thomas, Jr.
*Attorney, Agent, or Firm*—Dwight E. Morrison; Everet F. Smith

[57] ABSTRACT

Novel methods and compositions for inhibiting the growth of weed-grasses and broadleaf weeds by employing an arylsulfonylurea, or a salt thereof, as the herbicidally active ingredient.

11 Claims, No Drawings

HERBICIDAL METHOD EMPLOYING ARYL-SULFONYLUREAS OR SALTS THEREOF

This invention relates to novel herbicidal compositions having broad though selective herbicidal activity and to herbicidal processes employing these compositions. More particularly, this invention concerns novel herbicidal processes employing compositions in which an arylsulfonylcarbamate ester, an arylsulfonylurea, or a salt thereof is the herbicidally active ingredient.

In the past, several types of broad spectrum herbicides have been available which could be used for killing dicotyledonous plants. One of these types includes 2,4-dichlorophenoxyacetic acid and related compounds. The monocotyledonous plants, which include the grasses, are not greatly affected by this type of herbicide, but only by nonselective herbicides, such as sodium arsenite, aminotriazole, sodium chlorate, and ammonium sulfamate, all of which effectively destroy all types of vegetation. Not many compounds have been found which will destroy monocotyledonous plants, such as grasses, preferentially to dicotyledonous plants, and only a very few compounds, among them diphenylacetonitrile and N,N-dimethyldiphenylacetamide, have been found which can destroy grasses and only certain classes of broadleaf plants.

It is an object of this invention to provide compositions which are toxic both to grasses in their germinating stage and to broadleaf weeds, but which are nontoxic to broadleaf crop-plants. It is a further object of this invention to provide novel compositions and processes which can eliminate weed grasses and certain broadleaf weeds selectively from crop-plants such as corn, cotton, soybeans, cucumbers, tomatoes, cantaloupes, and their close relatives in the plant kingdom.

In fulfillment of the above and other objects, this invention provides a novel process and compositions for inhibiting the growth of weed-grasses and broadleaf weeds. The novel process comprises applying to an area infested with weed seeds a herbicidal amount of one or more arylsulfonylcarbamate esters, arylsulfonylureas, or their respective salts, of the class represented by the following formula:

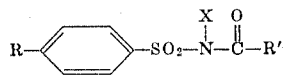

wherein R is $-NO_2$, $-NH_2$, or $-NHCOR''$; R' is $C_1-C_6$ alkoxy, amino, $C_1-C_6$ alkylamino, di($C_1-C_6$ alkyl)amino, arylamino, or N-($C_1-C_6$ alkyl)-N-arylamino; R'' is $C_1-C_6$ alkyl, $C_1-C_6$ haloalkyl, $C_2-C_4$ alkenyl, or $C_2-C_4$ haloalkenyl; and X is hydrogen, a metallic ion of the class of the alkali metals and alkaline earth metals, or a metalloid ion of the class of ammonium, or substituted ammonium.

In the above groups the alkyl radicals can be illustratively methyl, ethyl, n-propyl, isopropyl, n-butyl, sec.-butyl, tert.-butyl, n-amyl, isoamyl, n-hexyl, 3-methylpentyl, and the like. The haloalkyl radicals can be illustratively chloromethyl, trichloromethyl, trifluoromethyl, 1-bromoethyl, 2-chloroethyl, 3-chloropropyl, 2-bromobutyl, 5-chloroamyl, and the like. The alkenyl radicals can be illustratively allyl, methallyl, crotyl, 3-methyl-1-propenyl, and the like. The haloalkenyl radicals can be illustratively 2-chlorovinyl, 1-bromo-1-propenyl, 2-chloro-1-propenyl, 4-chloro-2-butenyl, 3-bromo-2-butenyl, and the like. Halo is haloalkyl or haloalkenyl radicals can be fluorine, chlorine, bromine, iodine, or astatine.

Aryl preferably represents a monocyclic aryl radical such as phenyl or substituted phenyl, for instance p-chlorophenyl, o-chlorophenyl, m-chlorophenyl, o-tolyl, m-tolyl, p-tolyl, o-anisyl, m-anisyl, p-anisyl, o-bromophenyl, m-bromophenyl, p-bromophenyl, o-trifluoromethylphenyl, m-trifluoromethylphenyl, p-trifluoromethylphenyl, and the like; furyl or substituted furyl such as 2-chlorofuryl, 3-chlorofuryl, 2-methylfuryl, 2-bromofuryl, 3-bromofuryl, 3-methylfuryl, 2-methoxyfuryl, 3-hydroxyfuryl, 2-trifluoromethylfuryl, and the like; thienyl and substituted thienyl such as 2-chlorothienyl, 3-chlorothienyl, 2-bromothienyl, 3-bromothienyl 2-methylthienyl, 3-methylthienyl, 2-methoxythienyl, 3-methoxythienyl, 2-hydroxythienyl, 3-hydroxythienyl, 2-trifluoromethylthienyl, and the like; pyridyl and substituted pyridyl such as 2-chloropyridyl, 3-chloropyridyl, 4-chloropyridyl, 2-bromopyridyl, 3-bromopyridyl, 4-bromopyridyl, 2-methoxypyridyl, 3-methoxypyridyl, 4-methoxypyridyl, 2-methylpyridyl, 3-methylpyridyl, 4-methylpyridyl, 2-trifluoromethylpyridyl, 3-trifluoromethylpyridyl, 4-trifluoromethylpyridyl, and the like.

X can be illustratively lithium, potassium, sodium, calcium, magnesium, ammonium and $C_1 - C_4$ lower-alkyl substituted ammoniums such as methylammonium, dimethylammonium, trimethylammonium, tetramethylammonium, ethylammonium, diethylammonium, triethylammonium, tetraethylammonium, n-propylammonium, di-n-propylammonium, n-butylammonium, tri-n-butylammonium, and the like.

As examples of compounds which have the desired herbicidal activity and which can be successfully employed as weed-killing agents in accordance with the process of this invention, there may be mentioned ethyl N-(p-nitrophenylsulfonyl)-carbamate, ethyl N-(p-acetamidophenylsulfonyl)carbamate, 1-(p-aminophenylsulfonyl)urea, 1-(p-aminophenylsulfonyl)-3-n-propylurea, 1-(p-nitrophenylsulfonyl)-3-methyl-3-phenylurea, 1-(p-nitrophenylsulfonyl)-3,3-di-n-butylurea, and 1-(p-aminophenylsulfonyl)-3-n-butylurea, sodium salt.

Compounds possessing the above structure preferably are formulated for use as pre-emergent selective herbicides either as dusts, spray concentrates, spreadable granules, or wettable powders. The compounds are quite insoluble in water and, for the preparation of emulsion-type sprays or wettable powders, the compounds desirably are formulated with a wetting agent or surfactant. The wetting agent or surfactant used in formulating the emulsion-type sprays or wettable powders can be illustratively polyoyethylene sorbitan mono-oleate, polyoxyethylene sorbitan mono-laurate, polyglycol ether sulfonates, alkylamine dodecylbenzenesulfonate, and the like. In the preparation of spreadable granules, the solid diluent used can be calcined attapulgite clay. Dry dispersions can be prepared on herbicidally inert carriers such as vermiculite, peat moss, and the like.

The novel process of this invention comprises treating a soil area or locus infested with weed grass seeds and broadleaf weed seeds with a dust, granular formulation, or spray containing a compound coming within the scope of the above formula as the herbicidally active ingredient. Typical of soil areas which can be treated are turfs or sods such as bluegrass turf, Zoysia turf, St. Augustine turf, bentgrass turf, fescue turf, Bermuda turf, or mixtures of these containing in addition seeds or seedlings of undesirable grasses; crop-growing areas in which crops other than corn are being grown; flower beds, strawberry patches, and similar areas of cultivation; and in other miscellaneous places such as gravel driveways, clay tennis courts, walks, road shoulders, and the like, where the elimination of grasses is desired. Compositions containing the herbicidally active compound are sprayed, dusted, or spread by methods well known to the art onto the particular area at the rate of around 2 to 32 pounds per acre or somewhat more if necessary; for example, 50 pounds of active ingredient per acre. For most field applications, we prefer to spray or dust the herbicidal compositions of this invention at the rate of about 4 to about 16 pounds of active ingredient per acre. If, however, the herbicidal compositions are spread in a granular form over the area to be treated, we prefer to employ a greater amount of active material per acre, suitably in the range of about 8 to 16 pounds of an active arylsulfonylcarbamate or arylsulfonylurea.

Germinating seeds of many varieties of grasses are killed by the above treatment process, including both undesirable grasses such as the crabgrasses (*Digitaria sanguinalis* and *Digitaria ischaemum*); green and yellow foxtails (*Setaria viridis* and *Setaria lutescens*); Johnson grass (*Sorghum halepense*); goose grass (*Eleusine indica*); sandbur (*Cenchrus pauciflorus*); witchgrass (*Panicum capillare*); and the like, as well as the germinating seeds of desirable grasses such as Bermuda grass (*Cynodon dactylon*); Kentucky bluegrass (*Poa pratensis*, including both Merion and Delta strains); field and sweet corn (*Zea mays*); fescue (*Festuca elatior*); domestic oats (*Avena sativa*); orchard grass (*Dactylis glamerata*); red top (*Agrostis alba*); rye (*Secale cereale*); Italian ryegrass (*Loluimmultiflorum*); sorghum (*Sorghum vulgare*); timothy (*Phleum pratense*); wheat (*Triticum sestivum*); and the like.

As previously stated, the herbicidal compositions of this invention do not affect leguminous plants either in the pre-emergent germinating stage of growth, the post-emergent seedling stage, or the mature stage of growth. Among the leguminous plants which will tolerate concentrations of the herbicidal compositions of this invention sufficient to eliminate grasses in the pre-emergent growth stage are the following: alfalfa (*Medicago sativa*); bush or pole beans (*Phaseolus vulgaris*); crimson clover (*Trifolium incarnatum*); Dutch white clover and Ladine clover (*Trifolium repens*); sweet clover (*Meliletus alba*); cowpeas (*Vigna sinensis*); lespedesa (*Lespedeza cuneata*); Alaska peas (*Pisum sativum*); soybeans (*Glycine max*); and, hairy vetch (*Vicia villesa*).

When sprays or dusts containing an arylsulfonylcarbamate ester, an arylsulfonylurea, or a salt thereof, as represented by the above formula are applied at the rate of about 8 pounds of herbicidal compound per acre to bluegrass or bentgrass turfs infested with foxtail and crabgrass seeds, these undesirable grasses can be eradicated provided the spray or dust is applied before they germinate. At a lower rate of application, for example, 4 to 5 pounds of herbicidal compound per acre, 80 to 90 percent of the foxtail and all of the crabgrass seedlings are eliminated by the treatment. On the other hand, amounts as high as 16 pounds per acre of a herbicidally active arylsulfonylcarbamate or arylsulfonylurea do not harm turfs composed of bentgrasses, Bermuda grass, Kentucky bluegrass, centipede grass (*Erenochloa ephiuroides*), St. Augustine grass (*Stenotaphrum secundatum*) or Zoysia (*Zoysia japonica*, Meyer strain).

In addition to eliminating crabgrass, foxtail, goose grass and other annual weed grasses from established lawns, the herbicidal compositions of this invention can be employed in other useful ways. For example, spray or dust compositions as provided by this invention can be used to eliminate seedling corn from a soybean field or to eradicate crabgrass from a perennial flower bed or to destroy germinating seeds of Bermuda grass in a cucumber field. Other methods of employing the selective herbicidal compositions of this invention will be readily apparent to those skilled in the art.

While all of the arylsulfonylcarbamate esters, arylsulfonylureas, or salts thereof falling within the scope of the above formula show selective killing of grasses in the pre-emergent stage of growth, certain of the compounds, particularly those with a free amino or nitro group in the benzene ring and no alkyl group on the sulfonyl nitrogen atom, are especially advantageous in that they show some herbicidal action against broadleaf weeds. For example, both 1-(p-nitrophenylsulfonyl)urea and 1-(p-aminophenylsulfonyl)urea show considerable activity against seedlings of mustard (*Brassica juncea*) when applied at the rate of 8 pounds per acre to an area containing this weed.

A number of the herbicidal methods and compositions of the present invention are illustrated by the following specific examples.

EXAMPLE 1

The following experimental procedure was used to demonstrate the efficacy of the compositions of this invention in killing germinating grasses without affecting the germination of seeds and the growth of seedlings of various broadleaf and leguminous plants.

A soil was prepared consisting of one part masonry sand and one part shredded top soil blended together in a cement mixer. One gallon of this soil was placed in a 25 × 35 cm. galvanized flat and was patted down with a bench brush until level. A three-row marker was used to make 2½ cm. furrows in approximately two-fifths of the flat. Crop seeds consisting of four kernals of corn, five cotton seeds, and five soybean seeds were placed in these furrows. A four-row template was then placed on the remaining soil and the indicated amounts of each of the following seeds were planted, one species to each section: foxtail, 100 mg.; broadleaf mustard (*Brassica juncea*), 50–75 mg.; rough pigweed (*Amaranthus retroflexus*), 30–50 mg.; and large crabgrass, 350–400 mg. Sufficient soil was added to cover the entire flat. Thus, the weed seeds were covered to a depth of about 6 mm. and the crop plant seeds were covered to a depth of about 3 cm.

In assaying the effect of the compositions as preemergent herbicides, a flat prepared as above was placed in a chamber equipped with a turntable and an air exhaust. The herbicidal composition, whether it was a spray-type emulsion formulated from the growth-inhibiting compound in combination with a wetting agent and a non-phytotoxic, inert diluent such as acetone, cellosolve dimethylformamide, water, and the like, or a wettable powder, was applied to the flat with a modified DeVilbiss atomizer hooked to an air source. Twelve and one-half milliliters of the composition under test were applied to each flat either on the day of planting or the succeeding day. For measuring the efficacy of the herbicidal compositions as post-emergent herbicides, the same experimental setup was used except that the flats were sprayed after 9 to 12 days in a green-house, the length of growing time depending upon the season and light intensity. Injury ratings and observations as to type of injury were made in either case 11 to 12 days after treatment. The injury rating scale used was as follows:

0 - no injury
1 - slight injury
2 - moderate injury
3 - severe injury
4 - death

When more than one determination was carried out, an average value was calculated for the injury rating.

Tables I and II which follow set forth the results of pre-emergent and post-emergent testing of several arylsulfonylcarbamate esters, arylsulfonylureas, and salts thereof. In both tables, column 1 gives the name of the compound; column 2, the rate in terms of pounds per acre at which the compound was applied to the test flat; and columns 3 to 9, the injury rating for the particular plant seedlings or mature plants.

TABLE I

| Compound | Lb./Acre | INJURY RATING ON PRE-EMERGENT TREATMENT | | | | | | |
|---|---|---|---|---|---|---|---|---|
| | | Corn | Cotton | Soybean | Crabgrass | Mustard | Pigweed | Foxtail |
| 1-(p-Aminophenyl-sulfonyl)-urea | 2 | 0 | 1 | 0 | 3 | 2 | 2 | 2 |
| | 4 | 0 | 1 | 0 | 3 | 1 | 1 | 1 |
| | 8 | 0 | 1 | 0 | 4 | 4 | 3 | 3 |
| 1-(p-Aminophenyl-sulfonyl)urea, Potassium salt | 2 | 1 | 1 | 1 | 2 | 2 | 2 | 0 |
| | 4 | 1 | 1 | 2 | 1 | 1 | 2 | 2 |
| | 8 | 1 | 1 | 1 | 3 | 3 | 3 | 3 |
| 1-(p-Aminophenyl-sulfonyl)-3-ethylurea | 2 | 0 | 0 | 0 | 3 | 2 | 1 | 1 |
| | 4 | 0 | 0 | 0 | 4 | 2 | 3 | 2 |
| | 8 | 2 | 0 | 0 | 4 | 3 | 2 | 3 |
| 1-(p-Nitrophenyl-sulfonyl)-urea | 2 | 0.5 | 1 | 0.5 | 3.5 | 2.5 | 1.5 | 3 |
| | 4 | 0.5 | 2 | 0.5 | 3.5 | 3 | 1.5 | 3 |
| | 8 | 0.5 | 1.5 | 1 | 4 | 2.5 | 2 | 3.5 |
| 1-(p-Nitrophenyl-sulfonyl)-3-methyl-3-phenylurea | 2 | 0 | 0.5 | 0 | 3 | 2.5 | 0.5 | 3 |
| | 4 | 0 | 0 | 0 | 3 | 4 | 2 | 3 |
| | 8 | 0.5 | 0.5 | 0 | 3.5 | 3 | 2 | 3.5 |
| Ethyl N-(p-nitrophenyl-sulfonyl)-carbamate | 2 | 0 | 0 | 0.2 | 3 | 3 | 0 | 1.5 |
| | 4 | 0.5 | 1 | 0.5 | 3.5 | 3 | 1.5 | 2 |
| | 8 | 1 | 0.5 | 0 | 3 | 3 | 0.5 | 3 |
| Ethyl N-(p-acet-amidophenyl-sulfonyl)-carbamate | 2 | 0 | 0 | 0 | 3 | 3 | 2 | 2 |
| | 4 | 1 | 1 | 1 | 3 | 3 | 2 | 3 |
| | 8 | 0.5 | 0.5 | 0 | 3.5 | 2.5 | 2.5 | 2.5 |
| 1-(p-Aminophenyl-sulfonyl)-3-n-butylurea | 2 | 0 | 0 | 0 | 2.5 | 2.5 | 1 | 0 |
| | 4 | 0 | 0 | 0 | 3 | 4 | 2 | 2 |
| | 8 | 0.6 | 0 | 0 | 4 | 3 | 1 | 2 |
| 1-(p-Aminophenyl-sulfonyl)-3-n-propylurea | 2 | 0 | 0 | 0 | 2.3 | 1.6 | 1 | 0.6 |
| | 4 | 0 | 0 | 0 | 3 | 2.5 | 1.5 | 1.5 |
| | 8 | 1.5 | 0 | 0.5 | 3.5 | 2.5 | 2.5 | 2 |
| 1-(p-Nitrophenyl-sulfonyl)-3-n-butylurea | 2 | 1 | 0 | 0 | 3 | 2 | 1 | 3 |
| | 4 | 0 | 0 | 0 | 4 | 3 | 2 | 4 |
| | 8 | 2 | 1 | 1 | 4 | 3 | 2 | 4 |
| 1-(p-Nitrophenyl-sulfonyl)-3-methylurea | 2 | 0 | 0 | 0 | 4 | 3 | 2 | 4 |
| | 4 | 0 | 1 | 0 | 4 | 3 | 3 | 4 |
| | 8 | 0.5 | 2 | 0.5 | 4 | 3 | 3 | 3.5 |

TABLE I — Continued

INJURY RATING ON PRE-EMERGENT TREATMENT

| Compound | Lb./Acre | Corn | Cotton | Soy-bean | Crab-grass | Must-ard | Pig-weed | Fox-tail |
|---|---|---|---|---|---|---|---|---|
| 1-(p-Nitro-phenyl-sulfonyl)-3,3-dimethylurea | 2 | 0 | 0 | 0 | 3 | 2 | 0.5 | 3 |
|  | 8 | 0.6 | 0 | 0 | 3 | 3 | 2 | 4 |
| 1-(p-Nitro-phenyl-sulfonyl)-3,3-di-n-butylurea | 2 | 0 | 1 | 0 | 3 | 2 | 0 | 3 |
|  | 8 | 0.5 | 0 | 0 | 3.5 | 3 | 1 | 3.5 |
| 1-(p-Nitro-phenyl-sulfonyl)-urea, Potassium salt | 2 | 0 | 2 | 0 | 4 | 3 | 3 | 4 |
|  | 8 | 1.5 | 1.5 | 0.5 | 3.5 | 3 | 3 | 3.5 |
| 1-(p-Amino-phenyl-sulfonyl)-3-n-butylurea, Sodium salt | 2 | 0 | 0 | 0 | 2.3 | 1.6 | 0.3 | 0.3 |
|  | 4 | 0 | 0 | 0 | 3 | 2.3 | 0.6 | 0.3 |
|  | 8 | 0 | 0 | 0 | 4 | 3 | 3 | 2 |

TABLE II

INJURY RATING ON POST-EMERGENT TREATMENT

| Compound | Lb./Acre | Corn | Cotton | Soy-bean | Crab-grass | Must-ard | Pig-weed | Fox-tail |
|---|---|---|---|---|---|---|---|---|
| 1-(p-Amino-phenyl-sulfonyl)-urea | 2 | 0 | 1 | 1 | 2 | 2 | 2 | 2 |
|  | 8 | 2 | 1.5 | 1.5 | 2 | 2 | 2 | 2 |
| 1-(p-Amino-phenyl-sulfonyl)-urea, Potassium salt | 2 | 1 | 0.5 | 1 | 1.5 | 1.5 | 1.5 | 1 |
|  | 4 | 1.5 | 0.5 | 0.5 | 2.5 | 1 | 1 | 1 |
|  | 8 | 1.5 | 1 | 1 | 2 | 1 | 0.5 | 0.5 |
| 1-(p-Amino-phenyl-sulfonyl)-3-ethyl-urea | 2 | 1.5 | 0.5 | 2 | 2.3 | 1 | 0.6 | 0 |
|  | 4 | 1.5 | 0.5 | 0.5 | 2.5 | 1 | 1 | 1 |
|  | 8 | 1.5 | 1 | 2 | 2 | 1 | 0.5 | 0.5 |
| 1-(p-Nitro-phenyl-sulfonyl)-urea | 2 | 1 | 1 | 1 | 2 | 1.5 | 1 | 1 |
|  | 4 | 1 | 1 | 1 | 2 | 1.5 | 1.5 | 1.5 |
|  | 8 | 2 | 1 | 2 | 2 | 2 | 2.5 | 2.5 |
| 1-(p-Nitro-phenyl-sulfonyl)-3-methyl-3-phenylurea | 2 | 1 | 0.5 | 0.5 | 1.5 | 1.5 | 1.5 | 1.5 |
|  | 8 | 2.5 | 2 | 2 | 2 | 2 | 2 | 2 |
| Ethyl N-(p-nitro-phenyl-sulfonyl)-carbamate | 2 | 0 | 0 | 0 | 1.6 | 1 | 1 | 0 |
|  | 4 | 0.5 | 0 | 1 | 3.5 | 1 | 0.5 | 0.5 |
|  | 8 | 1 | 0 | 1 | 2.5 | 1.5 | 0 | 0.5 |

As is well understood in the art, the rates of application of herbicide required to produce a given result under the carefully controlled conditions of the greenhouse can be from a half to a fourth those required in the field.

1-(p-Nitrophenylsulfonyl)urea potassium salt was formulated as an emulsifiable concentrate for use in the above trials as follows: the compound, 53 g., was wetted by grinding with 8.75 g. of the surfactant or wetting agent polyoxyethylene sorbitan monolaurate, using a mortar and pestle, and 371 ml. water added to the creamy paste to yield a formula containing 12.3 percent of growth-inhibitory compound. Dilution of this concentrate by standard methods provided sprays of desired concentrations.

EXAMPLE 2

Further testing of certain of the compounds falling within the scope of the above formula was carried out against a broader spectrum of plants including various crop plants, broadleaf plants, broadleaf weeds, and desirable grasses. These tests were performed in the field to further demonstrate the efficacy of the compositions of this invention in killing germinating noxious grasses and weeds, such as rough pigweed, yellow foxtail, large crabgrass, and other native grasses as well as native broadleaf weeds, including lamb's-quarters (*Chenopodium album L.*) and velvet leaf (*Abutilon theophrasti Medic.*).

In assaying the effect of the compositions as preemergent herbicides under conditions simulating actual use in the field, each of the test plots was first cultivated and smoothed. The herbicidally active compositions were applied to individual plots by two different methods, surface spray (SS in Table III to follow) and preplant soil incorporation (PPI in Table III). In the former, the composition was simply sprayed on the surface of the soil at the desired rate of application just prior to the planting of selected crop and weed seeds. In the latter method, the herbicidal composition was sprayed on the surface of the soil and then incorporated into the top 2-inch layer of soil by roto-tilling, after which operation the seeding was done as usual. Injury ratings and observations as to type of injury was made 34 to 35 days after treatment. The observed injury to the plants was rated on a scale of from 0 to 9, 0 being no injury and 9 being death.

Table II, which follows, sets forth the results. In the table, column 1 gives the name of the compound; column 2, the rate of application in terms of pounds per acre and the manner of application; and columns 3 to 10, the injury rating for the particular plant seeds or seedlings.

EXAMPLE 3

In addition to the spray formulation described above, the herbicidally active compounds within the scope of this invention were formulated as dispersions on vermiculite as an inert diluent. For example, 1-(p-aminophenylsulfonyl)-3-n-butylurea was dissolved in acetone and the solution allowed to contact the vermiculite, whereby the active ingredient was adsorbed onto the vermiculite, which was then separated and dried. Sufficient herbicidal compound was used so that the resulting dispersion contained 10 percent by weight of the growth-inhibitory ingredient.

The arylsulfonylcarbamate esters and their salts useful in the herbicidal process and composition of this invention can be prepared by the reaction of an arysulfonamide with a halocarbonic acid ester in the presence of a basic reagent according to the procedure of Raffa et al., Farm. sci. e tec. 7, 271–9 (1952). The arylsulfonylureas employed in the invention can be synthesized by heating an appropriate arylsulfonylcarbamate ester with a primary or secondary amine, selected to produce the desired arylsulfonylurea, according to the procedure published by Marshall et al., J. Org. Chem. 23, 927–9 (1958), or by reaction of an arylsulfonamide with a suitable cyanate according to the processes disclosed by Haack U.S. Pat. No. 2,385,571 (Sept. 25, 1945) and Martin et al., U.S. Pat. No. 2,411,661 (Nov. 26, 1946). The arylsulfonylurea salts can be obtained directly in the processes disclosed by Haack and Martin, supra, or by the usual process of dissolving the arylsulfonylurea in a suitable solvent, making basic, and purifying the precipitated salt.

TABLE III

INJURY RATING ON PRE-EMERGENT TREATMENT - FIELD TESTS

| Compound | Lb./Acre | | Cucumbers | Cantaloupe | Tomato | Pigweed | Yellow-Foxtail | Large Crab-Grass | Native Grasses | Native Broadleaf |
|---|---|---|---|---|---|---|---|---|---|---|
| 1-(p-Aminophenylsulfonyl)-3-n-butylurea | 16 | SS | 5 | 3 | 4 | 8 | 7 | 9 | 8 | 8 |
| | 8 | SS | 0 | 0 | 4 | 7 | 8 | 9 | 9 | 8 |
| | 8 | PPI | 0 | 0 | 1 | 7 | 8 | 8 | 9 | 7 |
| | 4 | PPI | 4 | 4 | 4 | 6 | 7 | 9 | 6 | 7 |
| 1-(p-Aminophenylsulfonyl)-3-ethylurea | 9.6 | SS | 0 | 0 | 3 | 3 | 8 | 8 | 8 | 4 |
| | 4.8 | SS | 0 | 0 | 1 | 6 | 8 | 9 | 9 | 9 |
| | 4.8 | PPI | 3 | 3 | 4 | 9 | 8 | 9 | 8 | 8 |
| Ethyl N-(p-Acetamidophenylsulfonyl)-carbamate | 9.3 | SS | 2 | 4 | 5 | 4 | 8 | 8 | 9 | 7 |
| | 4.6 | SS | 0 | 0 | 2 | 6 | 8 | 9 | 9 | 7 |
| | 4.6 | PPI | 0 | 2 | 1 | 7 | 8 | 9 | 9 | 9 |
| | 2.3 | PPI | 0 | 2 | 5 | 6 | 5 | 5 | 3 | 5 |
| 1-(p-Nitrophenylsulfonyl)-urea | 16 | SS | 5 | 0 | 2 | 9 | 9 | 9 | 9 | 8 |
| | 8 | SS | 0 | 0 | 5 | 9 | 8 | 9 | 9 | 9 |
| | 4 | SS | 0 | 0 | 2 | 0 | 8 | 8 | 8 | 5 |
| | 8 | PPI | 6 | 4 | 2 | 8 | 8 | 9 | 9 | 9 |
| | 4 | PPI | 3 | 2 | 2 | 6 | 8 | 7 | 5 | 5 |
| 1-(p-Nitrophenylsulfonyl)-urea, Potassium salt | 12.2 | SS | 6 | 5 | 2 | 9 | 9 | 8 | 8 | 7 |
| | 6.1 | SS | 2 | 3 | 0 | 6 | 8 | 8 | 9 | 6 |
| | 3 | SS | 0 | 4 | 0 | 0 | 8 | 6 | 8 | 6 |

The following examples will serve to illustrate such preparations:

PREPARATION 1

Ethyl N-(p-Nitrophenylsulfonyl)carbamate

A suspension of 124 g. p-nitrophenylsulfonamide, 93 g. potassium carbonate, and 100 g. ethyl chlorocarbonate in 1 liter of water was stirred and refluxed in a round-bottom flask equipped with stirrer and reflux condenser for four hours. After cooling, the precipitate formed in the above reaction, comprising the potassium salt of ethyl N-(p-nitrophenylsulfonyl)carbamate, was recovered by filtration. The crude solid product was redissolved in boiling water and filtered hot to remove undesired impurities. The aqueous filtrate was acidified by the addition of 12N aqueous hydrochloride acid, thus forming ethyl N-(p-nitrophenylsulfonyl)-carbamate which precipitated as a white solid, m.p. 125°–128°C.

The product was further purified by copious washings with water until the washes gave a negative flame test for potassium. Ethyl N-(p-nitrophenylsulfonyl)carbamate thus purified melted at about 125°–128°C. and weighed 112.5 gm.

PREPARATION 2

1-(p-Nitrophenylsulfonyl)-3,3-di-n-butylurea

A mixture of 10 g. ethyl N-(p-nitrophenylsulfonyl)-carbamate and 4.8 g. of di-n-butylamine was prepared in a round-bottom flask fitted with a condenser, and the mixture was heated at a temperature of about 133°C. for about 2½ hours. 1-(p-Nitrophenylsulfonyl)-3,3-di-n-butylurea thus formed was purified by recrystallization from ethanol. Yield: 9.0 g., m.p. about 107°–109°C. The product contained one molecule of ethanol of crystallization.

| Analysis: | Calculated | C, 50.59; H, 7.24; N, 10.41 |
|---|---|---|
| | Found | C, 50.86; H, 7.08; N, 10.36 |

PREPARATION 3

1-(p-Nitrophenylsulfonyl)-3-methyl-3-phenylurea

Ten grams of ethyl N-(p-nitrophenylsulfonyl)carbamate and 4 g. N-methylaniline was placed in a small, round-bottom flask equipped with condenser, and the resulting mixture was heated at a temperature of about 133°C. for about 2½ hours. The syrupy residue comprising 1-(p-nitrophenylsulfonyl)-3-methyl-3-phenylurea and other reaction products was dissolved in ether and the ether solution extracted with 5 percent sodium hydroxide solution, thus forming the sodium salt of 1-(p-nitrophenylsulfonyl)-3-methyl-3-phenylurea which passed into the basic aqueous layer. The basic layer was washed with ether, the ether washed was discarded, and then the basic layer was made acidic by adding 10 percent aqueous hydrochloric acid, thus causing 1-(p-nitrophenylsulfonyl)-3-methyl-3-phenylurea to precipitate. This product was extracted into ether. The extracts were washed with water, dried over magnesium sulfate and concentrated to dryness in vacuo. The resulting oily residue crystallized from ethanol. 1-(p-Nitrophenylsulfonyl)-3-methyl-3-phenylurea thus prepared melted about 118.5°–121°C. after recrystallization from ethanol; yield, 3.7 g. This product also contained a molecule of ethanol of crystallization.

| Analysis: | Calculated | N, 11.02 |
|---|---|---|
| | Found | N, 10.88 |

PREPARATION 4 p-Nitrophenylsulfonylurea, Potassium Salt

A mixture of 175 g. p-nitrobenzenesulfonamide, 74 g. potassium cyanate, 1,250 ml. ethanol, and 325 ml. water was stirred and refluxed for 13 hours in a round-bottom flash equipped with mechanical stirrer and reflux condenser. The reaction mixture was then cooled to room temperature, and the crude, solid p-nitrophenylsulfonylurea potassium salt was filtered off and washed with acetone to remove colored by-products. The filtrate was discarded. The crude product was recrystallized from a mixture of ethanol and water to yield 100.5 g. p-nitrophenylsulfonylurea potassium salt melting at about 224°–225°C. with decomposition.

PREPARATION 5 p-Nitrophenylsulfonylurea

A solution of 67 g. p-nitrophenylsulfonylurea potassium salt in 670 ml. of water was acidified with 0.34 mole hydrochloric acid while being cooled in an ice bath. The solid p-nitrophenylsulfonylurea obtained by filtering the reaction mixture and drying the solid in vacuo weighed 60 g. and had a melting point of about 193°–4°C.

PREPARATION 6

1-(p-Aminophenylsulfonyl)-3-n-butylurea, Sodium salt

Pure 1-(p-aminophenylsulfonyl)-3-n-butylurea was dissolved at a temperature of 40°C. in an equimolecular quantity of 15 percent aqueous sodium hydroxide solution. The solution was then exactly neutralized, using phenolphthalein as the indicator, and filtered to remove solid impurities. The filtrate was cooled in the refrigerator for two days, during which time the sodium salt of 1-(p-aminophenylsulfonyl)-3-n-butylurea crystallized out and was filtered off and dried.

| Analysis: | Calculated | C, 45.04; H, 5.50; N, 14.33 |
|---|---|---|
| | Found | C, 44.77; H, 5.82; N, 13.93 |

We claim:

1. A method for inhibiting the growth of germinating grass seeds and of seedling grasses which comprises applying to a locus of said seeds and seedlings an effective amount of a compound having the following formula:

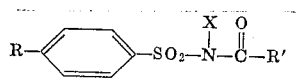

wherein R is a member of the group consisting of —NO$_2$, —NH$_2$, and —NHCOR''; R' is a member of the group consisting of, amino, C$_1$–C$_6$ alkylamino, di(C$_1$–C$_6$ alkyl)amino, monocyclic arylamino, substituted monocyclic arylamino, and N-(C$_1$–C$_6$ alkyl)-N-monocyclic arylamino; R'' is a member of the group consisting of C$_1$–C$_6$ alkyl, C$_1$–C$_6$ haloalkyl, C$_2$–C$_4$ alkenyl, and C$_2$–C$_4$ haloalkenyl; and X is a member of the group consisting of hydrogen, the alkali metals, the alkaline earth metals and ammonium. C$_1$ – C$_4$ lower-alkyl substituted ammoniums.

2. The method of claim 1 wherein said compound is applied in combination with an inert diluent.

3. The method of claim 1 wherein said compound is applied in combination with a surfactant and an inert diluent.

4. The method of claim 1 wherein said compound is applied at a rate between about 5 and about 20 pounds per acre.

5. The method of claim 1 wherein 1-(p-aminophenyl-sulfonyl)-3-ethylurea is the growth-inhibitory compound.

6. The method of claim 1 wherein 1-(p-nitrophenyl-sulfonyl)urea is the growth-inhibitory compound.

7. The method of claim 1 wherein 1-(p-nitrophenyl-sulfonyl)-3-methylurea is the growth-inhibitory compound.

8. The method of claim 1 wherein 1-(p-nitrophenyl-sulfonyl)urea potassium salt is the growth-inhibitory compound.

9. A method of inhibiting the growth of unwanted plants which comprises applying thereto a herbicidal quantity of a compound of the structure

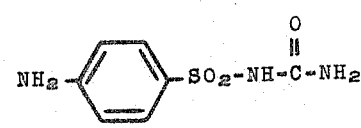

10. A method for the selective control of undesirable plant growth comprising applying to an area to be protected from such growth a herbicidally effective amount of a compound of the formula:

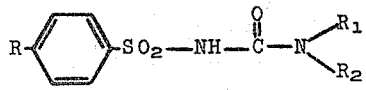

wherein R is selected from the group consisting of amino, acetylamino and nitro: R$_1$ and R$_2$ are selected from the group consisting of hydrogen and lower alkyl.

11. A method for the selective control of undesirable grass in an area in which desirable grasses are present, comprising the step of applying to said area herbicidally effective amount of a compound having the formula

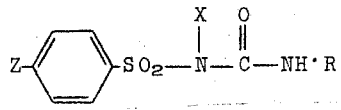

X is alkali metal or ammonium,
Z is NO$_2$, NH$_2$ or —NHCOR'
R is H or lower alkyl and
R' is lower alkyl.

* * * * *